SQUIRE RANSOM.
Improvement in Potato-Diggers.

No. 114,041. Patented April 25, 1871.

United States Patent Office.

SQUIRE RANSOM, OF KINGSVILLE, OHIO.

Letters Patent No. 114,041, dated April 25, 1871.

IMPROVEMENT IN POTATO-DIGGERS.

The Schedule referred to in these Letters Patent and making part of the same.

*To all whom it may concern:*

Be it known that I, SQUIRE RANSOM, of Kingsville, in the county of Ashtabula and State of Ohio, have invented a certain new and improved Potato-Digger; and I do hereby declare that the following is a full, clear, and complete description of the same, reference being had to the accompanying drawing making part of this specification, in which—

Figure 1:
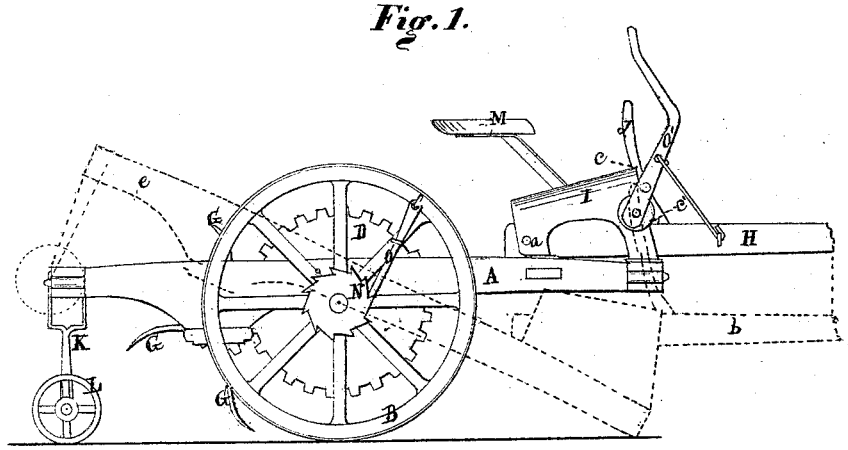
Figure 2:
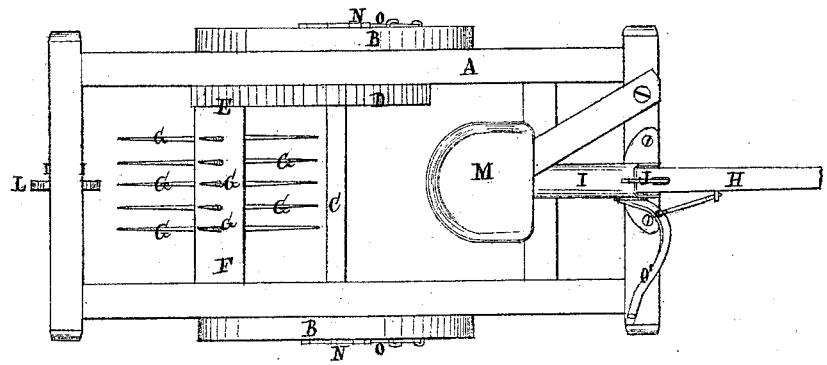
Figure 3:
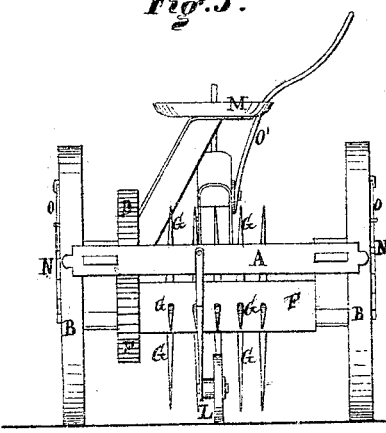

Figure 1 is a side elevation of the machine.
Figure 2 is a plan view.
Figure 3 is an end view.

Like letters of reference refer to like parts in the several views.

The object of this invention is to provide a ready, convenient, and expeditious way of digging potatoes by means of a machine consisting of a frame mounted upon wheels, and having therein a revolving cylinder armed with prongs, which strike into the ground and lift the potatoes to the surface, as hereinafter more fully described.

In the drawing, fig. 2—

A is an oblong square frame mounted upon the wheels B, of which wheels C is the axle.

On said axle is secured a cog-wheel, D, which is made to engage a pinion, E, on the cylinder F, journaled in the frame, and whereby said cylinder is made to rotate, for a purpose presently shown.

G are prongs secured in and projecting from the face of the cylinder, as shown.

H, figs. 1 and 2, is the pole or tongue of the machine, whereby it is drawn by the team.

Said pole is pivoted to the frame in a stay, I, at the point *a*, fig. 1, which allows of its being raised upward or downward, as indicated by the dotted lines *b*, and which is retained in either position by a catch, J, fig. 1, in the edge of which are notches *c c'*, which catch on the edge of the stay and thereby hold the tongue in position.

The upper notch holds the pole in the position shown in fig. 1, and the lower notch, when the pole is in the position indicated by the dotted lines *b*.

From the rear end of the machine depends an arm, K, fig. 1, to the lower end of which is secured a wheel, L, whereby the prongs are prevented from running too deeply into the ground.

The practical operation of this machine is as follows:

The team, on being hitched to it in the usual way, the operator takes his position on the seat M and drives off in the direction of the hills or rows of potatoes, the position of the machine being such as to bring the wheels B on each side of the row, thereby bringing the prongs directly across it. As the machine moves forward the cylinder rotates, motion being given to it by the wheels B and gearing.

The weight of the machine causes the prongs to strike into the ground sufficiently deep to reach the bottom of the hills, and which are lifted up by the prongs, bringing the potatoes to the surface, leaving them exposed upon the ground. The dirt having been sifted through the prongs, the potatoes are therefore left free from the dirt.

The depth that said prongs enter the ground is governed by the wheel L, and which also assists in carrying the frame.

It will be observed that the wheels B are not fixed to the axle, but are free to rotate thereon; but which, as they revolve, turn the axle by means of the ratchet-wheels N, fig. 1, secured to each end of the axle.

The teeth of the wheels catch a pawl, *o*, secured to the side of each wheel B, and thereby turn the axle when the machine is moving forward; but on a reverse movement of the machine, caused by backing up or on turning around, the wheels turn on the axle, and therefore give no motion to the gearing for operating the prongs.

For the purpose of transporting the machine from place to place the cylinder and prongs are elevated above the ground by lifting upward the rear end of the frame, as shown by the dotted lines *e*, fig. 1. The frame is retained in this position by means of the catch J, above referred to.

The lower notch therein catches upon the edge of the stay, and the frame is thus securely held in the position indicated by the dotted lines in fig. 1. This changing the relative position of the frame in its relation to the ground is done by the operator taking the lever O', fig. 1, in one hand, and pushing from or drawing it toward him, as the case may be.

Claim.

What I claim as my invention, and desire to secure by Letters Patent, is—

The revolving prongs G, gearing D E connected with the frame, in combination with the adjustable pole H, stay I, catch J, and lever O, substantially as and for the purpose set forth.

S. RANSOM.

Witnesses:
W. H. BURRIDGE,
J. H. BURRIDGE.